(12) United States Patent
Johanski et al.

(10) Patent No.: US 10,797,508 B2
(45) Date of Patent: Oct. 6, 2020

(54) PORTABLE DEVICE DOCKING STATION CHARGE MECHANISM

(71) Applicant: KONINKLIJKE PHILIPS N.V., Eindhoven (NL)

(72) Inventors: Brian Johanski, Snohomish, WA (US); Lewis McFadyen, Hong Kong (CN); Walter Julius Weichsler, Kirkland, WA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 108 days.

(21) Appl. No.: 16/306,100

(22) PCT Filed: Jun. 19, 2017

(86) PCT No.: PCT/EP2017/064976
§ 371 (c)(1),
(2) Date: Nov. 30, 2018

(87) PCT Pub. No.: WO2017/216388
PCT Pub. Date: Dec. 21, 2017

(65) Prior Publication Data
US 2019/0140471 A1    May 9, 2019

Related U.S. Application Data

(60) Provisional application No. 62/351,332, filed on Jun. 17, 2016.

(51) Int. Cl.
*H02J 7/00* (2006.01)
*H02J 7/02* (2016.01)
*H02J 50/40* (2016.01)
*H02J 50/12* (2016.01)
*H02J 50/70* (2016.01)
*H02J 50/10* (2016.01)

(52) U.S. Cl.
CPC ............ *H02J 7/025* (2013.01); *H02J 7/0027* (2013.01); *H02J 7/0044* (2013.01); *H02J 50/10* (2016.02); *H02J 50/12* (2016.02); *H02J 50/40* (2016.02); *H02J 50/70* (2016.02)

(58) Field of Classification Search
CPC ................................. H02J 7/025; H02J 50/10
USPC ......................................................... 320/108
See application file for complete search history.

(56) References Cited

U.S. PATENT DOCUMENTS 5,216,402 A    6/1993  Carosa
9,419,468 B1 *  8/2016  Pierson ................... H02J 7/025
(Continued)

FOREIGN PATENT DOCUMENTS

WO    2013093922 A2    6/2013

*Primary Examiner* — Suchin Parihar (57) ABSTRACT

An induction charging system (100) includes: (i) an induction charging station (10) having: an emitting primary induction coil (14); a receiving secondary induction coil (18); and a primary dock (20) for a primary chargeable device; (ii) a primary chargeable device (24) configured to reversibly engage the primary dock and comprising a receiving induction coil (26); and (iii) a secondary device in communication with the secondary induction coil and configured to receive energy from the secondary induction coil, wherein the secondary induction coil is configured to receive excess energy from the primary induction coil without interfering with the receiving induction coil.

14 Claims, 6 Drawing Sheets

(56) References Cited

U.S. PATENT DOCUMENTS

| | | | |
|---|---|---|---|
| 2005/0151511 A1* | 7/2005 | Chary | H02J 50/40 |
| | | | 320/127 |
| 2005/0275983 A1* | 12/2005 | Franklin | H01M 8/04559 |
| | | | 361/56 |
| 2009/0058361 A1* | 3/2009 | John | H04B 5/0062 |
| | | | 320/128 |
| 2010/0001685 A1* | 1/2010 | Eastlack | H02J 50/80 |
| | | | 320/108 |
| 2010/0141214 A1* | 6/2010 | Yoon | B60K 6/28 |
| | | | 320/134 |
| 2010/0164433 A1* | 7/2010 | Janefalkar | H02J 50/15 |
| | | | 320/115 |
| 2013/0157637 A1* | 6/2013 | Bos | H04W 8/245 |
| | | | 455/418 |
| 2013/0219098 A1* | 8/2013 | Turnpenny | H04M 1/04 |
| | | | 710/303 |
| 2014/0191568 A1 | 7/2014 | Partovi | |
| 2014/0285008 A1 | 9/2014 | Azancot et al. | |
| 2015/0280442 A1* | 10/2015 | Graham | H02J 7/025 |
| | | | 307/31 |
| 2015/0365003 A1* | 12/2015 | Sadwick | H02M 3/28 |
| | | | 363/21.01 |
| 2015/0371768 A1 | 12/2015 | Graham et al. | |
| 2016/0006291 A1* | 1/2016 | Li | H02J 7/025 |
| | | | 320/108 |
| 2016/0020638 A1 | 1/2016 | Hemesath et al. | |
| 2018/0090970 A1* | 3/2018 | Radchenko | H04B 5/0081 |
| 2019/0123591 A1* | 4/2019 | Azam | H02J 50/40 |

* cited by examiner

PORTABLE DEVICE DOCKING STATION CHARGE MECHANISM

CROSS-REFERENCE TO PRIOR APPLICATIONS

This application is the U.S. National Phase application under 35 U.S.C. § 371 of International Application No. PCT/EP2017/064976, filed on Jun. 19, 2017, which claims the benefit of U.S. Provisional Patent Application No. 62/351,332, filed on Jun. 17, 2016. These applications are hereby incorporated by reference herein.

FIELD OF THE INVENTION

The present disclosure is directed generally to methods and systems for harvesting excess charge energy from an induction charger.

BACKGROUND

Inductive or wireless charging utilizes an electromagnetic field to transfer energy from a charging station to a wireless or portable device. When the charging station and wireless device are in proximity to one another, there is an inductive coupling and energy generated by the charging station is used to charge a battery or run the portable device. The inductive charging station utilizes an induction coil to create an alternating electromagnetic field. The portable device comprises a second induction coil that interacts with the electromagnetic field and converts the energy back into electric current to charge the battery or run the device. Essentially, the induction coil in the charging station and the induction coil in the portable device form an electrical transformer.

Unfortunately, the portable device rarely, if ever, utilizes all of the available energy in the electromagnetic field. Accordingly, the charging station is creating and transmitting more energy than the system needs, and there can be significant energy loss, which is both inefficient and economically wasteful.

Accordingly, there is a need in the art for a mechanism for harnessing excess charge energy from an induction charger in order to increase efficiency and reduce loss.

SUMMARY OF THE INVENTION

The present disclosure is directed to inventive methods and systems for harnessing excess electromagnetic energy from an induction charger. Various embodiments and implementations herein are directed to an induction charger, such as a docking station, that includes both a primary and a secondary induction coil such that the primary induction coil creates an electromagnetic field, and the secondary induction coil converts energy from that electromagnetic field into electric current to charge a secondary device, without interfering with the functioning of a portable device induction coil that also energy from that electromagnetic field into electric current to charge a portable device. Accordingly, the docking station can power two devices without requiring additional energy input into the system.

Generally, in one aspect, an induction charger is provided. The induction charger includes: a housing with an emitting primary induction coil and a receiving secondary induction coil; a primary dock configured to reversibly engage a primary chargeable device in a first configuration, wherein in the first configuration a receiving induction coil of the primary chargeable device primary chargeable device receives energy from the primary induction coil; and a secondary device in communication with the secondary induction coil and configured to receive energy from the secondary induction coil, wherein the secondary induction coil is configured to receive excess energy from the primary induction coil without interfering with the receiving induction coil.

According to an embodiment, the secondary device is removable from the induction charger.

According to an embodiment, the induction charging station comprises a secondary dock for the secondary chargeable device.

According to an embodiment, the induction charger comprises an inner housing comprising the emitting primary induction coil and an outer housing comprising the receiving secondary induction coil. According to an embodiment, the inner housing is located at least partially inside the outer housing.

According to an embodiment, the induction charger includes one or more capacitive elements in parallel or series and configured to increase an amount of energy harnessed by the receiving secondary induction coil from the emitting primary induction coil.

According to an aspect is an induction charging system. The induction charging system includes: (i) an induction charging station with an emitting primary induction coil, a receiving secondary induction coil, and a primary dock for a primary chargeable device; (ii) a primary chargeable device configured to reversibly engage the primary dock and comprising a receiving induction coil; and (iii) a secondary device in communication with the secondary induction coil and configured to receive energy from the secondary induction coil, wherein the secondary induction coil is configured to receive excess energy from the primary induction coil without interfering with the receiving induction coil.

According to an aspect is a method for retrofitting an inductive charger. The method includes the steps of: (i) providing an inductive charger comprising a housing, an emitting primary induction coil, and a primary dock configured to reversibly engage a primary chargeable device; (ii) providing an outer housing comprising a receiving secondary induction coil and a secondary device in communication with the secondary induction coil; and (iii) mating the inductive charger and the outer housing, wherein when the inductive charger and the outer housing are mated, the secondary induction coil is configured to receive excess energy from the primary induction coil without interfering with a receiving induction coil of the primary chargeable device.

According to an embodiment, the inductive charger is located completely inside the outer housing when the inductive charger and the outer housing are mated.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

These and other aspects of the invention will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

The present disclosure describes various embodiments of an induction charging system. More generally, Applicant has recognized and appreciated that it would be beneficial to provide a method and system for harnessing excess charge from a charging station using a secondary induction coil of that charging station. The system includes a primary induction coil that creates an electromagnetic field, a device induction coil that converts the electromagnetic field into energy to charge a battery or run a first device, and a secondary induction coil that converts the electromagnetic field into energy to charge a battery or run a second device. Accordingly, the docking station can power two devices without requiring additional energy input into the system.

An induction charging station system as disclosed and described herein could be used, for example, with any personal care device or other portable or wireless device. Just one example of such a personal care device that the induction charging station could be used with is any Airfloss® device available from Koninklijke Philips Electronics N.V., among many others.

Figure 1:
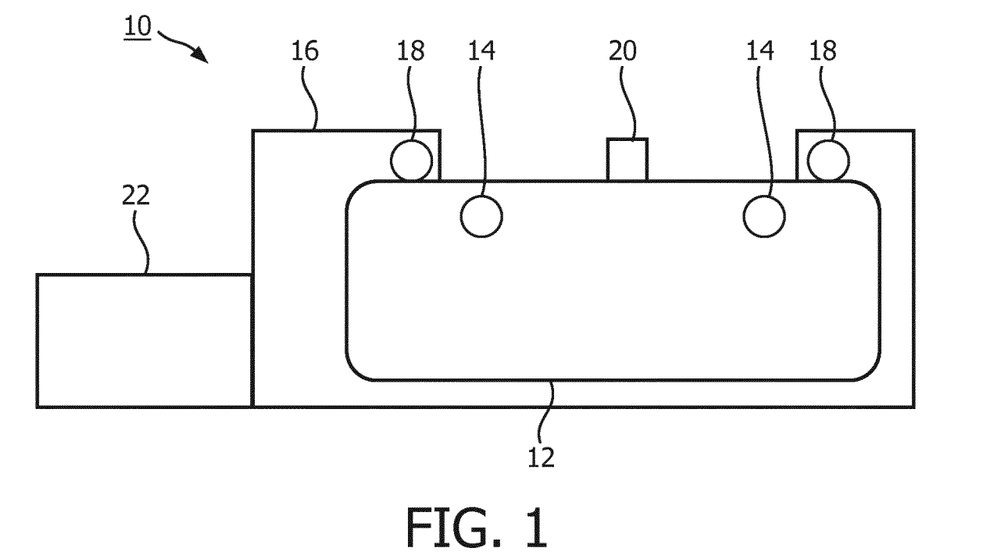
FIG. 1 is a cutaway side view of an inductive charging station, in accordance with an embodiment.

In view of the foregoing, various embodiments and implementations are directed to an induction charging station configured to harness excess energy from the induction coil. Referring to FIG. 1, in one embodiment, is side cutaway view of an induction charger or induction charging station 10. Induction charging station 10 includes an emitting primary induction coil 14. The primary induction coil 14 is connected to a power source and circuitry (not shown in FIG. 1) that results in the creation of an electromagnetic field by the primary induction coil. In this configuration, the primary induction coil is housed within an inner housing 12, which contains the primary induction coil and can contain part or all of the power source and circuitry necessary to generate the electromagnetic field by the primary induction coil 14. In another configuration, the power source and circuitry are located in an outer housing 16, or in a separate location or component of the system or device. The induction charging station 10 also includes a primary dock or battery or portable device engagement mechanism 20. The primary dock 20 is configured to receive a portable chargeable device 24 comprising a charging induction coil 26, shown in FIG. 3.

Induction charging station 10 also includes an outer housing 16 which contains a receiving secondary induction coil 18. The secondary induction coil is positioned within the device or system 10 in order to harness excess energy from the electromagnetic field. The secondary induction coil 18 is connected to circuitry (not shown in FIG. 1) necessary to harness and direct the harnessed energy. Although inner housing 12 and outer housing 16 are shown as separate components in FIG. 1, the induction charging station 10 may comprise a single housing with the primary induction coil 14 and the secondary induction coil 18.

Induction charging station 10 also includes a secondary charging dock or battery 22, which receives the harnessed energy from the secondary induction coil 18. The secondary charging dock or battery can engage a secondary portable device in order to charge that device, or can be a component of a fixed secondary device.

Figure 2:
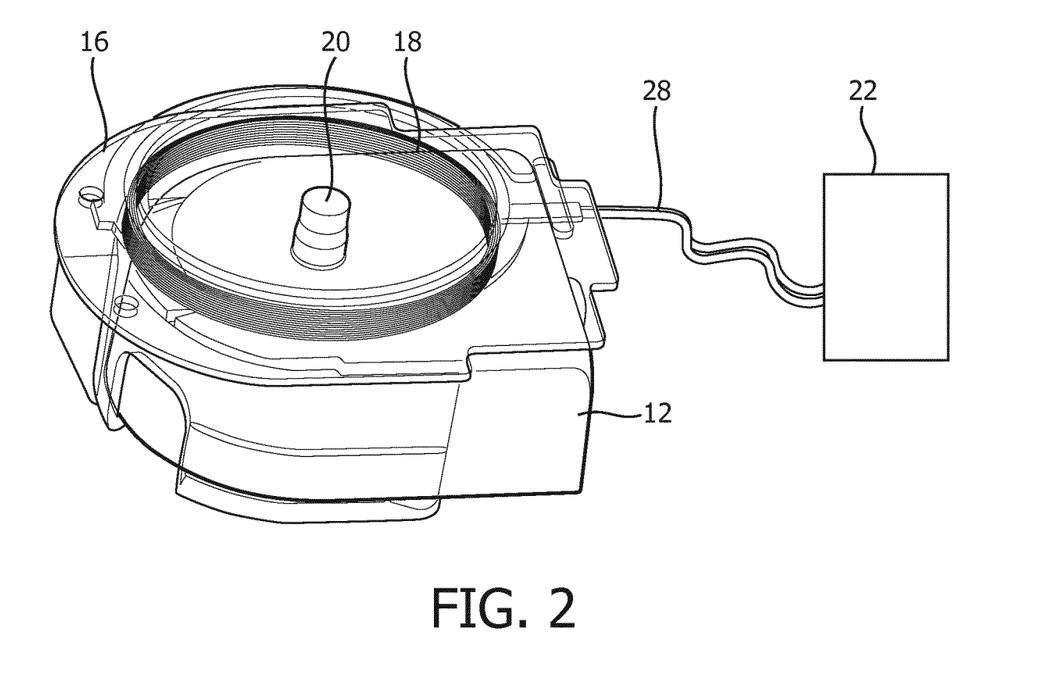
FIG. 2 is a top perspective view of an inductive charging station, in accordance with an embodiment.

Referring to FIG. 2, in one embodiment, is a perspective view of the induction charging station 10. According to this embodiment, the induction charging station 10 comprises an inner housing 12 with a primary induction coil (not shown), a primary dock 20, and an outer housing 16 with a secondary induction coil 18. The secondary induction coil is connected by a wired connection 28 to secondary charging dock or battery 22.

Figure 3:
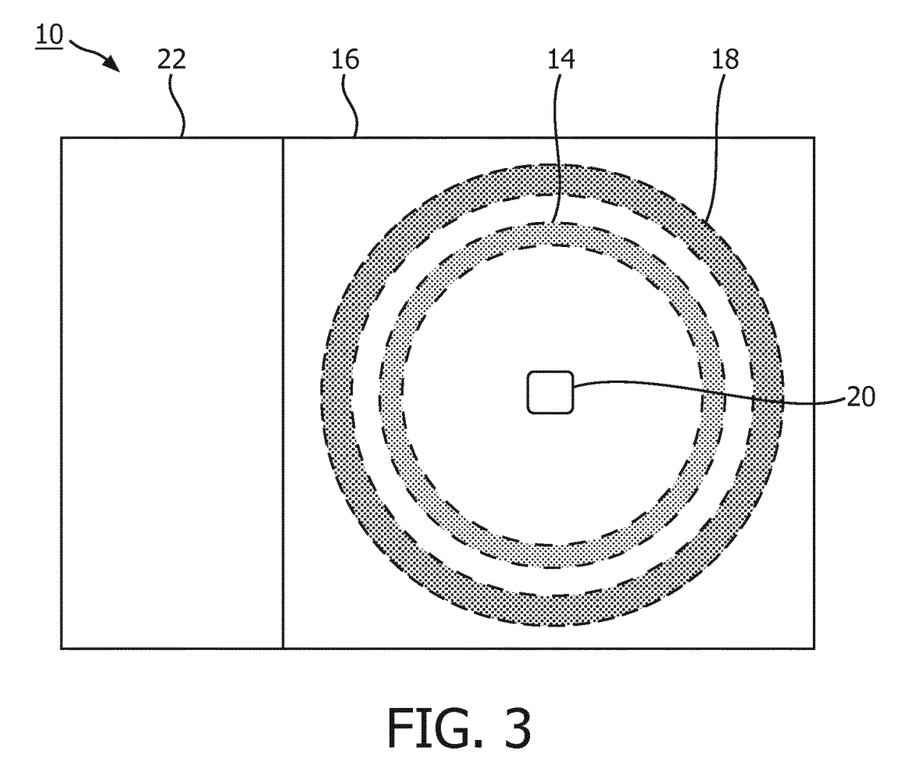
FIG. 3 is a top view of an inductive charging station, in accordance with an embodiment.

Referring to FIG. 3, in one embodiment, is a top view of the induction charging station 10. The induction charging station comprises a housing 16, which may be a single housing component, or may be an inner and outer housing. The housing 16 comprises a primary dock 20 for a portable charging device. The induction charging station also comprises a primary induction coil 14 and a secondary induction coil 18. Although the primary and secondary induction coils are illustrated as being non-overlapping in FIG. 3, any configuration of the primary and secondary induction coils is possible as long as the coils are substantially non-interfering, thereby allowing the first and second devices to charge.

Figure 4:
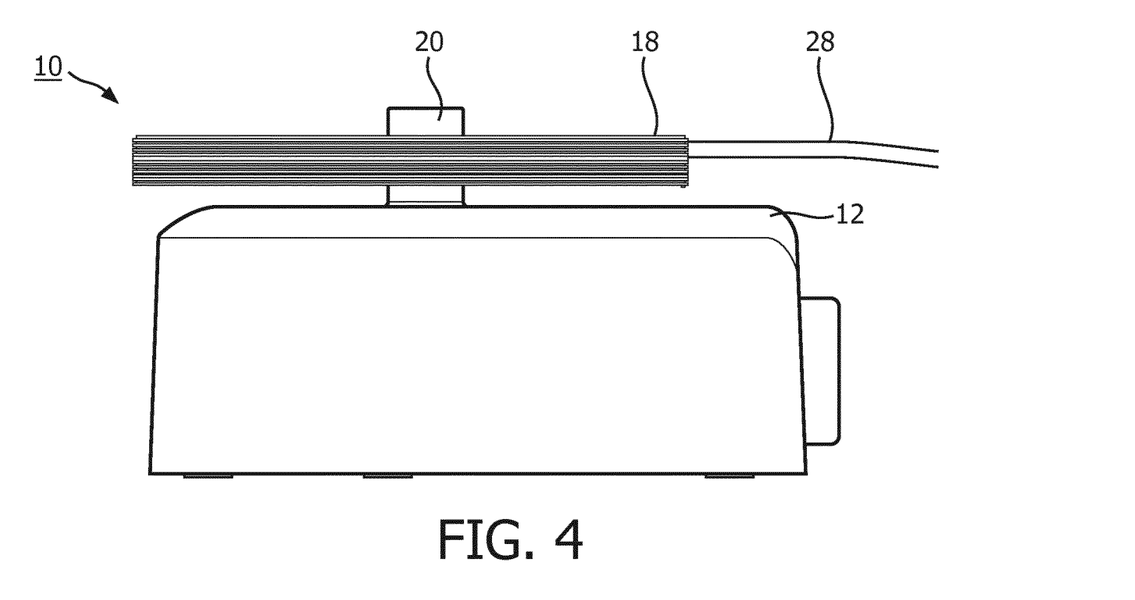
FIG. 4 is a side view of an inductive charging station, in accordance with an embodiment.

Referring to FIG. 4, in one embodiment, is a side view of the induction charging station 10 without the outer housing 16. Although shown without outer housing 16 in this view, the secondary induction coil 18 will typically be located within a protective housing, which also helps properly position the secondary induction coil relative to the primary induction coil. The induction charging station 10 comprises a primary dock 20 for a portable charging device, the secondary induction coil 18, a wired connection 28 leading to a secondary charging dock or battery 22 (not shown in FIG. 4), and a primary induction coil 14 (not shown in FIG. 4) located inside the inner housing 12.

Figure 5:
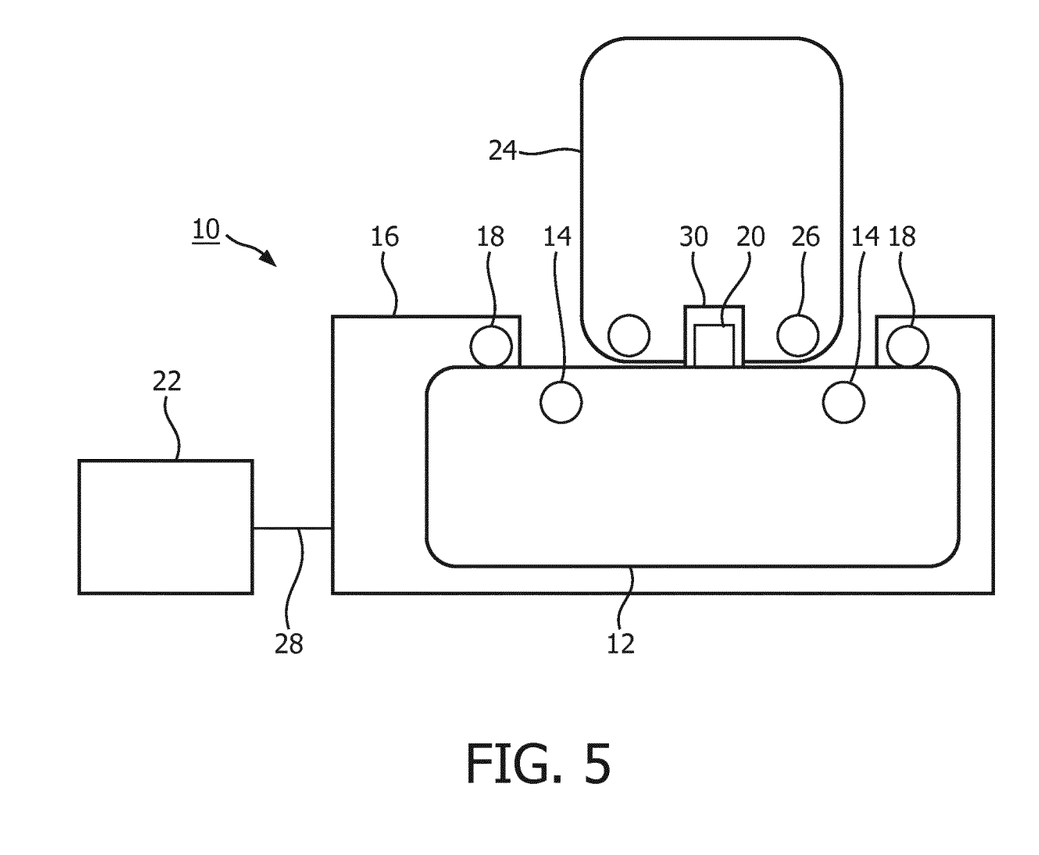
FIG. 5 is a cutaway side view of an inductive charging station with a portable rechargeable device, in accordance with an embodiment.

Referring to FIG. 5, in one embodiment, is a side cutaway view of an induction charging station 10 comprising an inner housing 12 with a primary induction coil 14, and an outer housing 16 with a secondary induction coil 18. The secondary induction coil is connected by a wired connection 28 to secondary charging dock or battery 22. The induction charging station 10 also includes a primary dock or battery or portable device engagement mechanism 20. The primary dock 20 is configured to receive a portable chargeable device 24 comprising a charging induction coil 26. In this example, the portable chargeable device 24 comprises a receptacle 30 that is configured to reversibly mate with the primary dock 20 of the station, thereby affixing the device in place. The chargeable device 24 can be any portable chargeable device, including but not limited to personal care devices such as power toothbrushes and electric shavers. Many other portable chargeable devices are possible. The charging induction coil 26 of the portable chargeable device 24 interacts with the electromagnetic field created by the primary induction coil 14 of the induction charging station 10 in order to charge the device 24. Accordingly, the portable chargeable device 24 comprises circuitry and a battery configured to store the harnessed energy.

Figure 6:
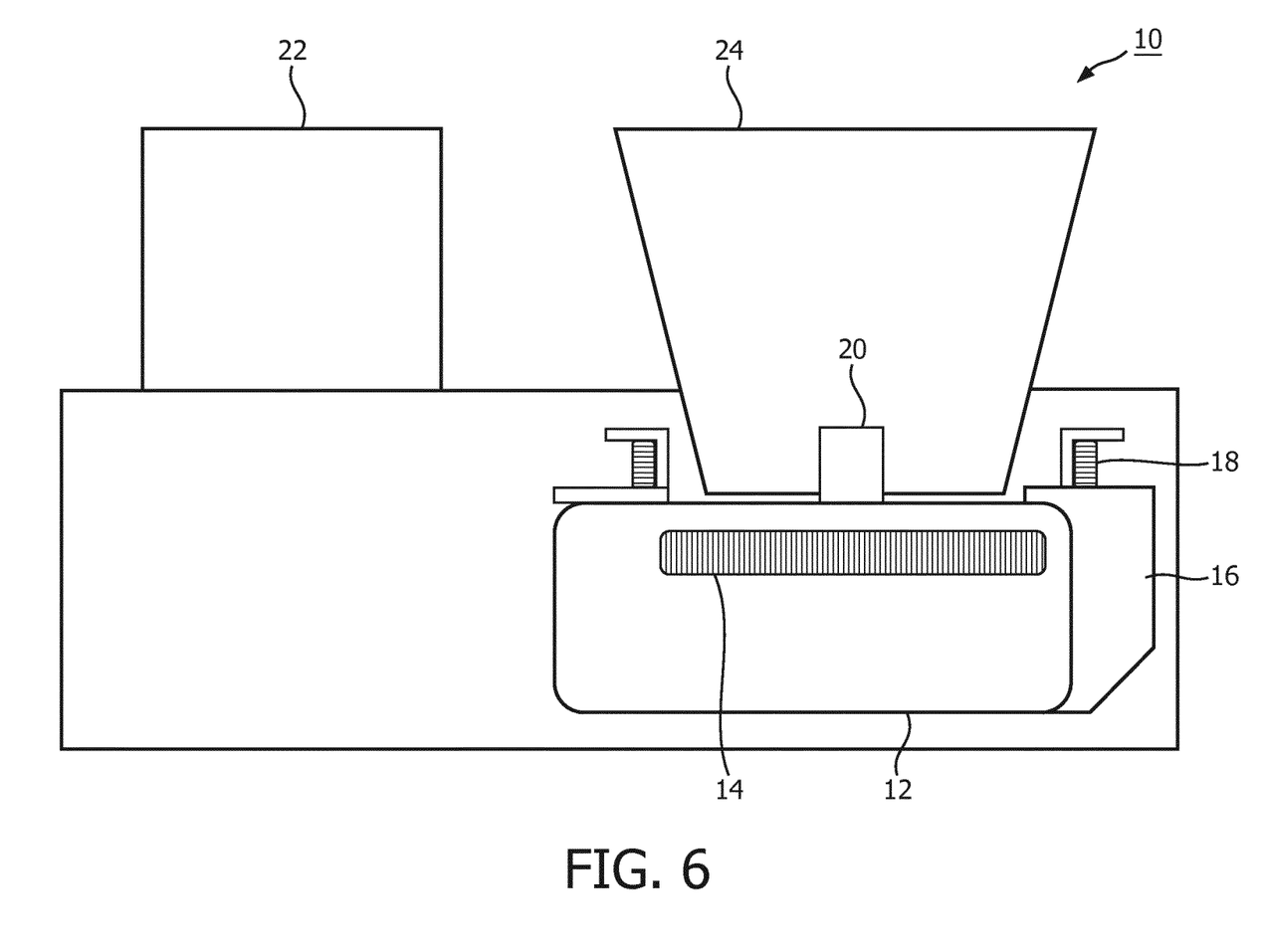
FIG. 6 is a cutaway side view of an inductive charging station with a portable rechargeable device and a secondary device, in accordance with an embodiment.

Referring to FIG. 6, in one embodiment, is a cutaway side view of an induction charging system 10. The induction charging system 100 comprises, for example, a docking station for a portable personal care device 24 such as a power toothbrush. The induction charging system also comprises a secondary device or dock 22. According to an embodiment, the inner housing 12 comprises a primary induction coil 14 and the outer housing 16 comprises a secondary induction coil 18. The secondary induction coil 18 harnesses excess charge from the primary induction coil 14, and uses that harnessed energy to power the secondary device or dock 22, which may be a removable device or fixed component. For example, according to an embodiment, the portable personal care device 24 can be a power water flossing device, and the secondary device 22 can be, for example, a powered reservoir or other accessory for the power water flossing device. When the portable personal care device 24 is mounted in the docking station and positioned on the charging mechanism, the portable device can be recharged when the standard induction charging mechanism is plugged into an electrical receptacle. Additionally, the standard induction charging mechanism can also be used to charge the portable device when it is not mounted in the docking station, such as when the owner is travelling and only wants to bring the charger and not the entire docking station.

Figure 7:
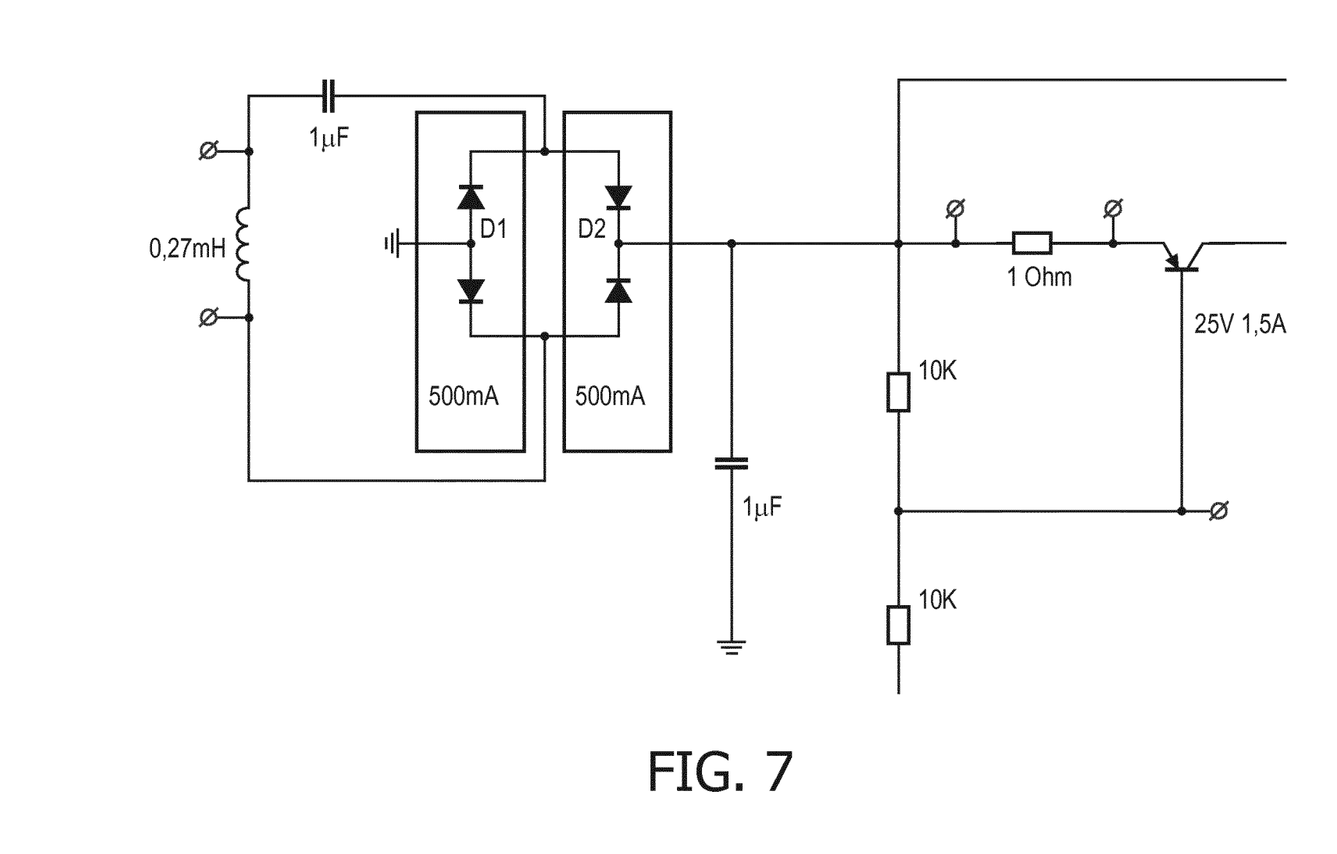
FIG. 7 is a partial circuit diagram from an inductive charging station, in accordance with an embodiment.

As described or otherwise envisioned herein, a secondary induction coil 18 in an induction charging station 10 allows for the extraction of excess power from the charger, which is power that the primary device 24 would be unable to extract on its own. According to an embodiment, the secondary induction coil 18 has a minimal impact on the charge current being delivered to the primary device, since the charger has capacity, and thus has minimal impact on the power being drawn from the mains. Additionally, according to an embodiment, elements of the secondary induction coil 18 such as coil quantity, positioning, and size can be optimized within the induction charging station 10 in order to optimize harnessing of the excess charge from the primary induction coil 14. For example, by tuning the resonance of the receiving coil, the picked up charge current can be adjusted. This allows for adjustment of how much of the transmitted energy reaches the secondary induction coils. For example, changing the charge current of the induction station 10 can adjust how much of the transmitted energy reaches the secondary induction coils 18. Further, according to an embodiment, the system can include one or more capacity and/or capacitive elements, in series and/or in parallel, in order to change the resonance of the receiving circuitry and optimize harnessing of the excess charge from the primary induction coil 14. Referring to FIG. 7, in one embodiment, is an example of a circuit design for an induction charger comprising a series capacitor in order to optimize harnessing of the excess charge from the primary induction coil.

According to an embodiment, a standard induction charger can be retrofitted with an outer shell or device comprising a secondary induction coil 18. The retrofitted induction charger is configured to harness excess energy from the primary induction coil without significantly interfering with the induction coil of the portable device.

Figure 8:
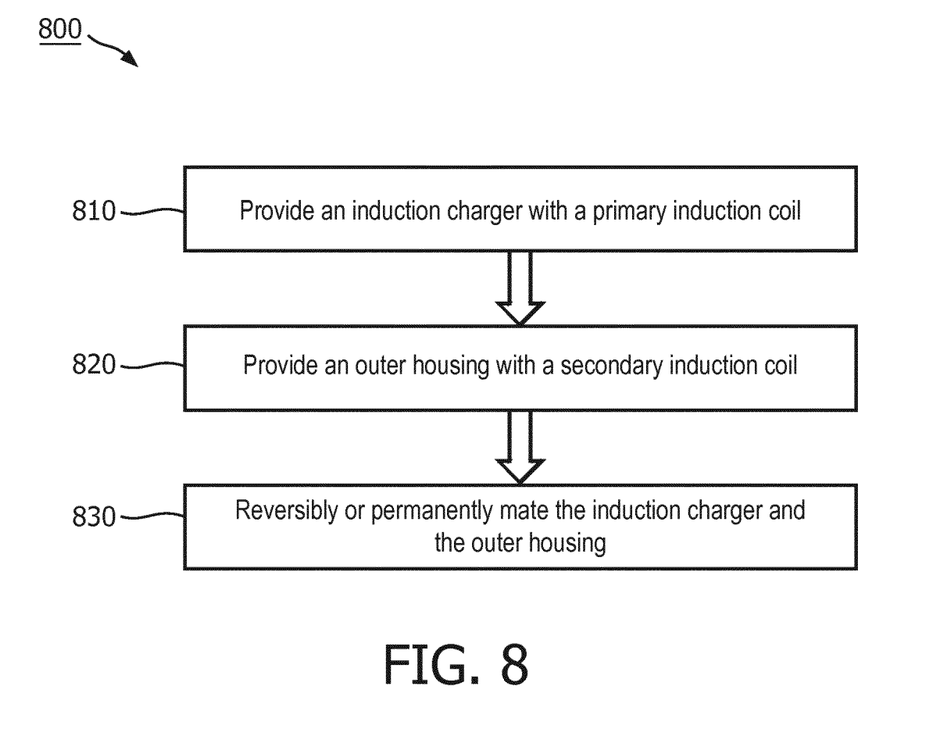
FIG. 8 is a flowchart of a method for retrofitting an inductive charging station, in accordance with an embodiment.

Referring to FIG. 8, in one embodiment, is a method 800 for retrofitting an induction charger. At step 810 of the method, an induction charger is provided. The induction charger will typically comprise a housing 12 and a primary induction coil 14. In FIGS. 1 and 2, for example, the induction charger would be elements 12, 14, and 20 without the remaining components. According to an embodiment, the induction charger also comprises the remaining elements necessary for inductive charging of the portable device, including a power source, a controller, circuitry, and any other necessary components.

At step 820 of the method, the secondary induction coil 18 is provided. According to an embodiment, the secondary induction coil 18 is located within an outer housing 16. The outer housing 16 is structured such that all or part of the induction charger housing 12 with the primary induction coil can reversibly or permanently reside within the outer housing. Further, the outer housing is configured such that when the housing 12 is properly situated within the outer housing 16, the secondary induction coil is located in a proper position with regard to the primary induction coil, thereby preventing interference with charging of the primary rechargeable device and ensuring that the secondary induction coil can harness excess energy from the primary induction coil. According to an embodiment, the outer housing 16 is structured such that the secondary induction coil 18 is approximately positioned as shown in, for example, FIGS. 2, 4, and 6, although other configurations are possible.

According to an embodiment, the outer housing also comprises or is configured to engage with a secondary charging dock or battery 22, which receives the harnessed energy from the secondary induction coil 18. The secondary charging dock or battery can engage a secondary portable device in order to charge that device, or can be a component of a fixed secondary device.

At step 830 of the method, the induction charger with the primary induction coil and the outer housing 16 with the secondary induction coil are reversibly or permanently mated together. For example, as shown in FIG. 2, the induction charger 12 with primary induction coil 14 can slide or snap into outer housing 16 with secondary induction coil 18, which only partially encompasses the induction charger 12. According to another embodiment, the outer housing 16 can completely encompass the induction charger 12. When the induction charger with the primary induction coil and the outer housing 16 with the secondary induction coil are reversibly or permanently mated together, the induction coil of the portable device can charge the device using energy harnessed from the primary induction coil without interference, and the secondary induction coil can contemporaneously harness the excess energy from the primary induction coil.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

What is claimed is:

1. An induction charger comprising:
   an inner housing, comprising an emitting primary induction coil;
   an outer housing comprising a receiving secondary induction coil;
   a primary dock configured to engage a primary chargeable device in a first configuration, wherein in the first configuration a receiving induction coil of the primary chargeable device receives energy from the emitting primary induction coil; and
   a secondary device dock in communication with the receiving secondary induction coil and configured to receive energy from the receiving secondary induction coil, wherein the receiving secondary induction coil is configured to receive excess energy from the emitting primary induction coil without interfering with the receiving induction coil.

2. The induction charger of claim 1, wherein the secondary device dock comprises a secondary chargeable device.

3. The induction charger of claim 2, wherein the secondary chargeable device is removable from the induction charger.

4. The induction charger of the claim 1, further comprising one or more capacitive elements in parallel or series, wherein the one or more capacitive elements are configured to increase an amount of energy harnessed by the receiving secondary induction coil from the emitting primary induction coil.

5. An induction charging system, the system comprising:
   an induction charging station comprising: an emitting primary induction coil; a receiving secondary induction coil; and a primary dock for a primary chargeable device;
   a primary chargeable device configured to reversibly engage the primary dock and comprising a receiving induction coil; and
   a secondary device in communication with the receiving secondary induction coil and configured to receive energy from the receiving secondary induction coil, wherein the receiving secondary induction coil is configured to receive excess energy from the emitting primary induction coil without interfering with the receiving induction coil.

6. The induction charging system of claim 5, wherein the secondary device is removable from the induction charging system.

7. The induction charging system of claim 6, wherein the induction charging station comprises a secondary dock for the secondary device.

8. The induction charging system of claim 5, wherein the induction charging station comprises: an inner housing comprising the emitting primary induction coil; and an outer housing comprising the receiving secondary induction coil.

9. The induction charging system of claim 8, wherein the inner housing is located at least partially inside the outer housing.

10. A method for retrofitting an inductive charger, the method comprising the steps of:
    providing an inductive charger comprising: a housing; an emitting primary induction coil; and a primary dock configured to reversibly engage a primary device;

providing an outer housing 16 comprising: a receiving secondary induction coil; and a secondary device in communication with the receiving secondary induction coil; and mating the inductive charger and the outer housing, wherein when the inductive charger and the outer housing are mated, the receiving secondary induction coil is configured to receive excess energy from the emitting primary induction coil without interfering with a receiving induction coil of the primary device.

11. The method of claim 10, wherein the secondary device is removable.

12. The method of claim 11, wherein the outer housing comprises a secondary dock for the secondary device.

13. The method of claim 10, wherein the outer housing further comprises one or more capacitive elements in parallel or series, wherein the one or more capacitive elements are configured to increase an amount of energy harnessed by the receiving secondary induction coil from the emitting primary induction coil.

14. The method of claim 10, wherein the inductive charger is located completely inside the outer housing when the inductive charger and the outer housing are mated.

* * * * *